E. F. FISHER.

HYDRODYNAMIC BALANCE.

APPLICATION FILED MAR. 29, 1913.

Reissued Mar. 24, 1914.

13,702.

INVENTOR.

Ernest F. Fisher

WITNESSES:

W. M. Fero.

B. J. Green

BY

Jas. H. Green

HIS ATTORNEY IN FACT

UNITED STATES PATENT OFFICE.

ERNEST F. FISHER, OF PITTSBURGH, PENNSYLVANIA.

HYDRODYNAMIC BALANCE.

13,702. Specification of Reissued Letters Patent. Reissued Mar. 24, 1914.

Original No. 1,049,836, dated January 7, 1913, Serial No. 612,957. Application for reissue filed March 29, 1913. Serial No. 757,690.

*To all whom it may concern:*

Be it known that I, ERNEST F. FISHER, a resident of Pittsburgh, in the county of Allegheny and State of Pennsylvania, have invented certain new and useful Improvements in Hydrodynamic Balances, of which the following is a specification.

The object of this invention is to provide a highly efficient instrument of simple and improved construction for recording variations of fluid pressure, and particularly the difference between two pressures which may be in opposition to each other, or otherwise, according to the circumstances under which they exist, or the conditions under which the instrument is used. Viewing the invention in the aspect last mentioned it is in effect a differential pressure gage.

Broadly considered, the invention consists of a movably mounted frame provided with means for maintaining it normally in a given position, and with means for communicating the pressure or pressures to be gaged to the frame in such manner as to move it from normal position and thereby effecting the movement of suitable recording means.

Specifically, the invention consists of a balanced frame which carries a magnet which causes the recording means to move with it. In the preferred adaptation disclosed herein the balanced magnet-carrying frame is inclosed in a liquid filled chamber, and the pressure or pressures to be gaged are communicated to one or a pair of hollow bodies carried by the frame, the bodies operating in conjunction with air confined therein much like scale pans in determining the oscillations of the frame, the pressure or pressures to be gaged being communicated to one or both of the bodies in manner presently to be explained.

Figure 1:
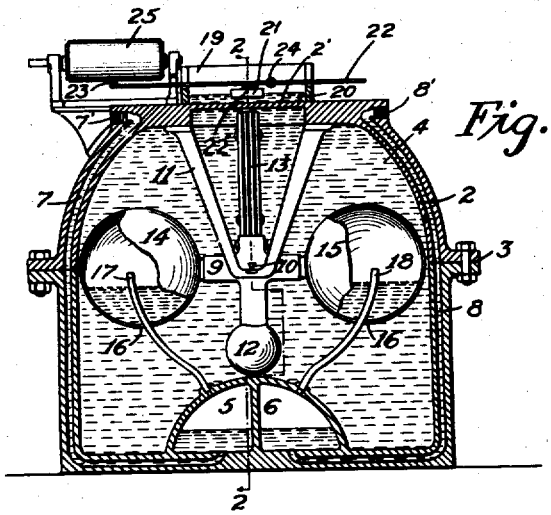
Figure 3:
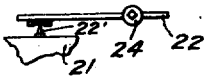
Figure 2:
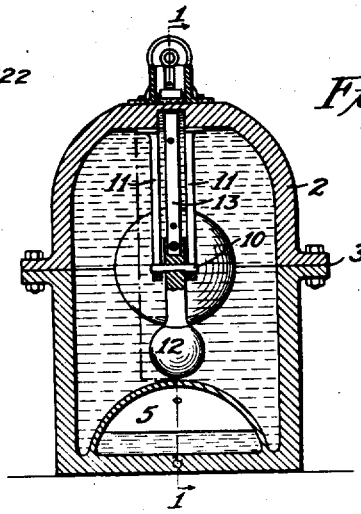

In the accompanying drawings, Figure 1 is a vertical longitudinal section of apparatus embodying the invention, taken on line 1—1 of Fig. 2, and Fig. 2 is a cross-section on line 2—2 of Fig. 1. Fig. 3 is a detail of the pivoted magnet-operated recorder or marker.

Referring to the drawings, 2 designates a closed chamber which may be formed in sections as at 3, the chamber being filled with liquid 4, as water or a suitable oil. At the lower portion of chamber 2, preferably adjacent the bottom thereof, are the two supplemental chambers 5 and 6 to which lead the pressure communicating passages or ports 7 and 8, respectively, said ports being here shown cored in the walls of chamber 2 and rising to the full height of the liquid 4 within said chamber. The passages 7 and 8 are filled with liquid as shown, and this liquid partially fills chambers 5 and 6.

Within chamber 2 is the movable frame 9 here shown centered by the knife-edge fulcrum 10 on hangers 11, the equilibrium of the frame being normally maintained by the depending weight 12. In line with this counterweight and with fulcrum 10 is the compound magnet 13 which projects upwardly into close proximity to the recessed top wall 2′ of chamber 2.

Carried by frame 9 at opposite sides of its fulcrum are the hollow bodies 14 and 15, each provided with an opening 16 at its bottom, with the air conducting pipes 17 and 18 extending from the upper portions of chambers 5 and 6 and through said openings into the bodies without touching them. Pipes 17 and 18 are curved complementary with the arc of movement of the bodies as they oscillate with frame 9, so that such movement is not impeded in any way.

On top of chamber 2 is the receptacle 19 which contains a suitable liquid 20 for supporting metallic float 21 in relatively close proximity to the extremity of magnet 11, the latter operating through wall 2′ and liquid 20, and moving the float to one side or the other according to the direction in which the magnet oscillates. Pivoted at 22′ on the float is elongated arm 22 which extends through the slotted ends of receptacle 19 with one end of the arm carrying a suitable marker or stylus 23 of usual construction, the marker being held by the arm counterweight 24 in contact with an index card mounted on carrier 25. The latter may be operated by any of the means well known in this class of instruments, such as a clock work, not shown.

The normal position of the parts is as shown in Figs. 1 and 2, with frame 9 and magnet 13 in line vertically with fulcrum 10, and with the hollow bodies 14 and 15 each containing the same amount of liquid admitted through openings 16, the fluid in passages 7 and 8 which extends to an elevation equal to that of the main fluid body 4 preventing the hollow bodies, under normal conditions, from filling further, as will be understood. Pipes are connected to the upper ends 7′, 8′ of passages 7 and 8 for communicating the pressures to be gaged. When operating as a differential gage the parts maintain the central position indicated in the drawings when the pressures are equal. If a preponderating pressure is communicated for instance to passage 7, the fluid therein and the fluid in chamber 5 force some of the air in chamber 5 through tube 17 into the air space of body 14 which results in ejecting some of the liquid from said body to make room for the entering air. As body 2 is closed and filled with liquid the described action results in forcing as much additional liquid into body 15 as has been forced out of body 14, with the result that body 15 lowers proportionately and body 14 rises, thus oscillating frame 9 and moving magnet 13 toward the right hand, Fig. 1, with the magnet recording arm moving therewith, as will be understood. A reverse action ensues if the preponderating pressure is communicated to port 8. It is obvious that by closing pressure communication to one or the other of ports 7 or 8, the apparatus will operate for gaging or recording a single pressure communicated to the instrument through the remaining open port.

I claim:

1. The combination of a closed chamber filled with liquid, a frame mounted to oscillate on a horizontal axis within the chamber, a hollow body within the chamber and movable with said frame, said body being open for the admission of liquid from the chamber and partially filled by said liquid with the remainder of the body filled with air, a pressure communicating conduit in communication with the air space of said body, and movable recording mechanism actuated by said frame.

2. The combination of a closed chamber filled with liquid, a magnet mounted on a horizontal axis within the chamber, a hollow body within the chamber and movable with the magnet, said body being open for the admission of liquid and normally partially filled with liquid with the remaining space therein filled with air, a supplemental air chamber, an air conducting connection between the latter and the air confining portion of the hollow body, a pressure communicating conduit extending to the supplemental chamber, and recording means actuated by the magnet.

3. The combination of a closed chamber filled with liquid, a magnet mounted on a horizontal axis within the chamber, a hollow body within the chamber and movable with the magnet, said body being open for the admission of liquid and normally partially filled with liquid with the remaining space therein filled with air, a supplemental air chamber, an air conducting connection between the latter and the air confining portion of the hollow body, a pressure communicating conduit extending from the supplemental chamber and rising to the height of the main chamber, said conduit and a portion of the supplemental chamber containing a liquid, and recording means actuated by the magnet.

4. The combination of a closed chamber filled with liquid, a magnet, a magnet-carrying frame within the chamber and balanced on a horizontal axis, a hollow body supported by and movable with the frame and open for the admission of liquid from the chamber, the body being partially filled with such liquid with the remainder of its interior filled with air, and a conduit for communicating the pressure to be recorded to the air-filled portion of the hollow body, and recording mechanism actuated by the magnet.

5. The combination of a closed chamber filled with liquid, a frame within the chamber and mounted on a horizontal axis, a magnet carried by the frame, hollow bodies supported by the frame at opposite sides of its pivot and movable therewith, the bodies being open for the admission of liquid from the chamber and partially filled with such liquid with the remainder of the space therein filled with air, pressure communicating conduits in communication respectively with the hollow bodies, and recording means actuated by the magnet.

6. The combination of a closed chamber filled with liquid, a frame within the chamber and mounted to oscillate on a horizontal axis, a weight depending from the frame and a magnet projecting upwardly therefrom, hollow bodies at opposite sides of the frame axis and movable with the frame, the bodies having openings at their under sides for admission of liquid from the chamber with the bodies partially filled with such liquid and the remainder of the space therein filled with air, two supplemental air chambers with means establishing communication between said chambers respectively and the air confining portions of the hollow bodies, pressure communicating conduits extending to the supplemental chambers with fluid filling said conduits and partially filling the chambers and recording mechanism actuated by the magnet.

7. The combination of a closed chamber filled with liquid, a frame within the chamber and balanced on a horizontal axis, a magnet carried by the frame, hollow bodies supported by the frame at opposite sides of its axis and movable with the frame, each of the bodies having an opening at its under side for admission of liquid from the chamber and with the body partially filled with such liquid and the remaining portion of its space filled with air, supplemental air chambers beneath said frame, pipes extending from the supplemental chambers and curved complementary with the arc of movement of the hollow bodies and extending through the bottom openings of the latter and into the air confining portions of their interior, pressure communicating conduits extending to the supplemental chambers with liquid filling said conduits and partially filling the supplemental chambers, and recording mechanism actuated by the magnet.

8. The combination of a closed chamber, two hollow bodies mounted to swing on a horizontal axis within said chamber and each having a port or opening in its bottom, liquid partially filling said bodies and all of said chamber, pressure conduits, one leading to the interior of each of said bodies through its port, fluid of less specific gravity than said liquid filling the space in each of said bodies not filled by said liquid, and movable recording mechanism actuated by said bodies.

9. The combination of a closed chamber, a frame mounted to swing on a horizontal axis within said chamber, two hollow bodies carried by said frame and each having a port or opening in its under side, liquid within said chamber and partially filling said bodies, pressure conduits, one leading through the port of each of said bodies, fluid of less specific gravity than said liquid filling the space in each of said bodies not filled by said liquid, and movable recording mechanism actuated by said frame.

10. The combination of a closed chamber, a frame mounted to swing on a horizontal axis within said chamber, two hollow bodies carried by said frame and each having a port or opening on its under side, liquid within said chamber and partially filling said bodies, pressure conduits, one leading through the port to the interior of each of said bodies, fluid of less specific gravity than said liquid filling the space in each of said bodies not filled by said liquid, a magnet carried by said frame, and movable recording mechanism actuated by said magnet.

11. The combination of a closed chamber, a frame mounted to swing on a horizontal axis within said chamber, two hollow bodies carried by said frame and each having a port or opening in its under side, fluid within said chamber and partially filling said bodies, pressure conduits, one leading to the interior of each of said bodies through its port, fluid of less specific gravity than said other fluid filling the space in each of said bodies not filled by said other fluid, and movable recording mechanism actuated by said frame.

In testimony whereof, I have hereunto subscribed my name this 28th day of March, 1913.

ERNEST F. FISHER.

Witnesses:
C. W. McGhee,
Ada Romig.